(12) United States Patent
Gan et al.

(10) Patent No.: US 11,443,764 B1
(45) Date of Patent: Sep. 13, 2022

(54) WAVEGUIDE HAVING PLASMONIC STRIPS FOR HEAT-ASSISTED MAGNETIC RECORDING

(71) Applicant: Seagate Technology LLC, Cupertino, CA (US)

(72) Inventors: Choon How Gan, Londonderry (GB); Mark Anthony Gubbins, Donegal (IE); Beverley Rutherford McConnell, Eglinton (GB); Martin Peter McCurry, Londonderry (GB); Michael James Hardy, Londonderry (GB); Andres David Barbosa Neira, Londonderry (GB); Fadi El Hallak, Londonderry (GB); Anil Kumar Puri, Londonderry (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/291,491

(22) Filed: Mar. 4, 2019

Related U.S. Application Data

(60) Provisional application No. 62/640,084, filed on Mar. 8, 2018.

(51) Int. Cl.
| | |
|---|---|
| *G11B 5/48* | (2006.01) |
| *G11B 5/31* | (2006.01) |
| *G02B 6/122* | (2006.01) |
| *G11B 13/08* | (2006.01) |
| *G11B 5/00* | (2006.01) |

(52) U.S. Cl.
CPC .......... *G11B 5/4866* (2013.01); *G02B 6/1226* (2013.01); *G02B 6/1228* (2013.01); *G11B 5/3133* (2013.01); *G11B 13/08* (2013.01); *G11B 2005/0021* (2013.01)

(58) Field of Classification Search
CPC ..... G11B 13/08; G11B 5/3133; G11B 5/4866; G11B 2005/0021; G11B 5/31; G11B 5/314; G11B 5/3163; G11B 5/6088; G11B 5/1278; G02B 6/1228; G02B 6/1226
See application file for complete search history.

(56) References Cited

U.S. PATENT DOCUMENTS

| | | | | |
|---|---|---|---|---|
| 7,706,654 B2 * | 4/2010 | Peng | ...................... | G11B 5/314 369/112.27 |
| 8,451,705 B2 | 5/2013 | Peng et al. | | |
| 8,867,170 B1 * | 10/2014 | Sasaki | .................... | G11B 5/314 360/125.3 |
| 8,873,352 B1 * | 10/2014 | Jandric | ................ | G11B 5/3133 369/13.13 |

(Continued)

*Primary Examiner* — Brian E Miller
(74) *Attorney, Agent, or Firm* — Mueting Raasch Group

(57) ABSTRACT

An apparatus includes a slider configured for heat-assisted magnetic recording. The slider includes an input coupler configured to receive light excited by a light source. The slider includes a waveguide core tapering along a light propagation direction from a first cross-sectional width to a second cross-sectional width, the waveguide configured to provide a surface plasmon-enhanced near-field radiation pattern proximate an output end in response to the received light. One or more cladding layers surround the waveguide core. At least one strip of plasmonic material is disposed between the waveguide core and at least one of the one or more cladding layers.

18 Claims, 6 Drawing Sheets

(56) References Cited

U.S. PATENT DOCUMENTS

| | | | |
|---|---|---|---|
| 9,099,130 B2 | 8/2015 | Gubbins et al. | |
| 9,230,582 B2 | 1/2016 | Itagi et al. | |
| 9,263,071 B1 * | 2/2016 | Cao | G11B 5/6088 |
| 9,484,051 B1 * | 11/2016 | Krichevsky | G11B 5/3133 |
| 10,026,421 B1 * | 7/2018 | Barbosa Neira | G11B 5/1871 |
| 10,262,683 B2 * | 4/2019 | Staffaroni | G11B 5/314 |
| 10,490,221 B1 * | 11/2019 | Chen | G11B 13/08 |
| 2005/0078565 A1 * | 4/2005 | Peng | G11B 7/1387 |
| | | | 369/13.32 |
| 2010/0142079 A1 * | 6/2010 | Tanaka | G11B 5/314 |
| | | | 360/59 |
| 2013/0223196 A1 | 8/2013 | Gao et al. | |
| 2013/0279035 A1 * | 10/2013 | Peng | G02B 5/10 |
| | | | 359/853 |
| 2016/0351209 A1 * | 12/2016 | Chen | G11B 5/314 |
| 2017/0221505 A1 * | 8/2017 | Staffaroni | G11B 5/314 |
| 2018/0108373 A1 * | 4/2018 | Fernandez Garcia | |
| | | | G02B 6/1226 |
| 2018/0261240 A1 * | 9/2018 | Blaber | G11B 5/1871 |

\* cited by examiner

_US 11,443,764 B1_

WAVEGUIDE HAVING PLASMONIC STRIPS FOR HEAT-ASSISTED MAGNETIC RECORDING

RELATED APPLICATIONS

This application claims the benefit of Provisional Patent Application Ser. No. 62/640,084 filed on Mar. 8, 2018, which is hereby incorporated herein by reference in its entirety.

SUMMARY

Embodiments described herein are directed to an apparatus comprising a slider configured for heat-assisted magnetic recording. The slider comprises an input coupler configured to receive light excited by a light source. The slider comprises a waveguide core tapering along a light propagation direction from a first cross-sectional width to a second cross-sectional width, the waveguide configured to provide a surface plasmon-enhanced near-field radiation pattern proximate an output end in response to the received light. One or more cladding layers surround the waveguide core. At least one strip of plasmonic material is disposed between the waveguide core and at least one of the one or more cladding layers.

Embodiments are directed to an apparatus comprising a slider configured for heat-assisted magnetic recording. The slider comprises an input coupler configured to receive light excited by a light source. The slider comprises a waveguide core tapering along a light propagation direction from a first cross-sectional width to a second cross-sectional width, the waveguide configured to provide a surface plasmon-enhanced near-field radiation pattern proximate an output end in response to the received light. The waveguide core has a first side facing a write pole of the slider and a second opposing side facing away from the write pole. A top cladding layer is disposed on the first side of the waveguide core and a bottom cladding layer is disposed on the second side of the waveguide core. At least one strip of plasmonic material is disposed between the waveguide core and at least one of the top cladding layer and the bottom cladding layer.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

Figure 1:
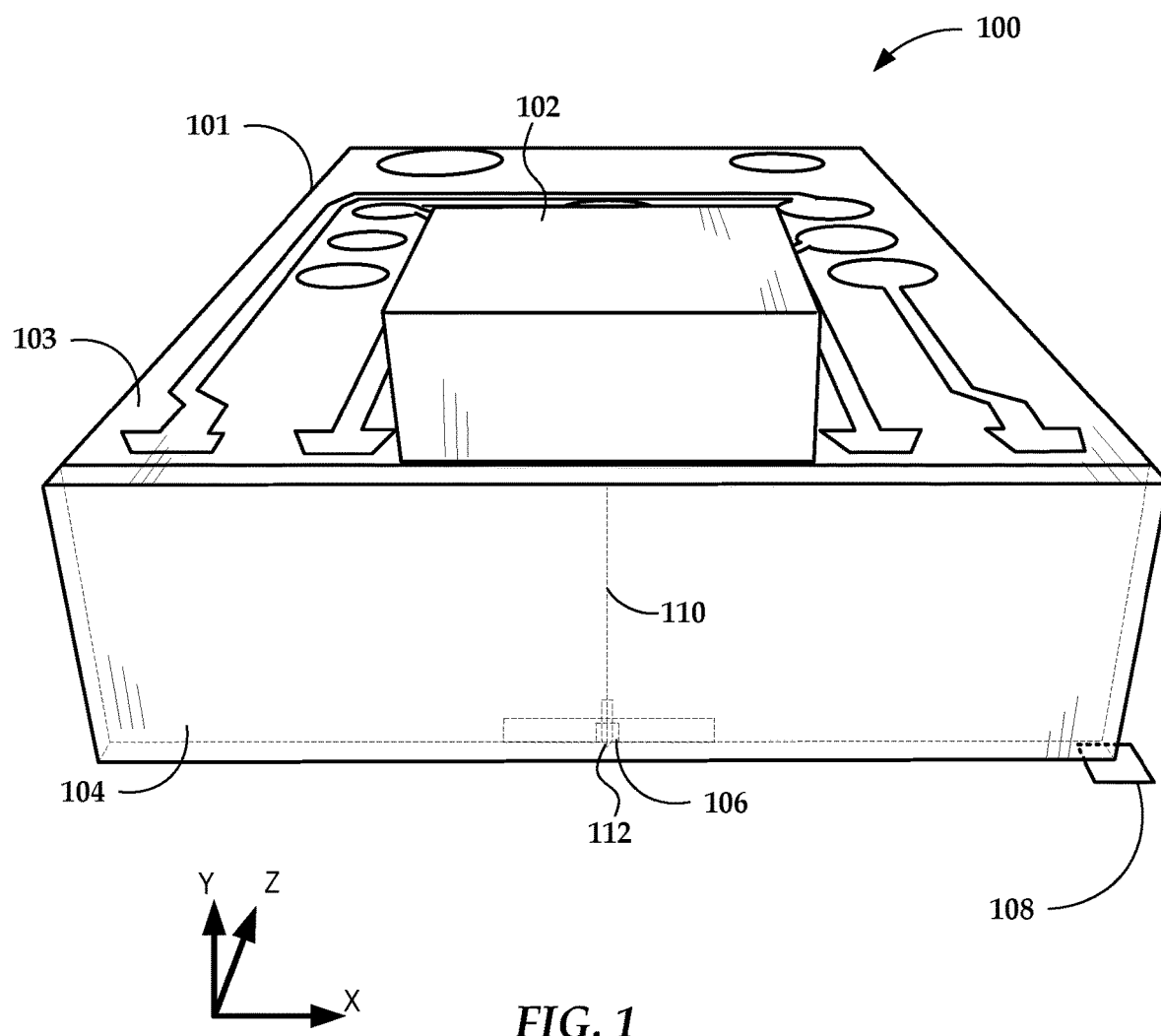
FIG. 1 is a perspective view of a hard drive slider that includes a waveguide in accordance with embodiments described herein.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as waveguide system 110, are formed integrally within the slider body 101 (near a trailing edge surface 104 in this example) and function as an optical path that delivers energy from the laser diode 102 to the recording media via a near-field transducer (NFT) 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide. Embodiments described herein may be applicable to a system in which at least part of a semiconductor laser or material to form a laser (e.g., epitaxial layer) is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment.

Figure 2:
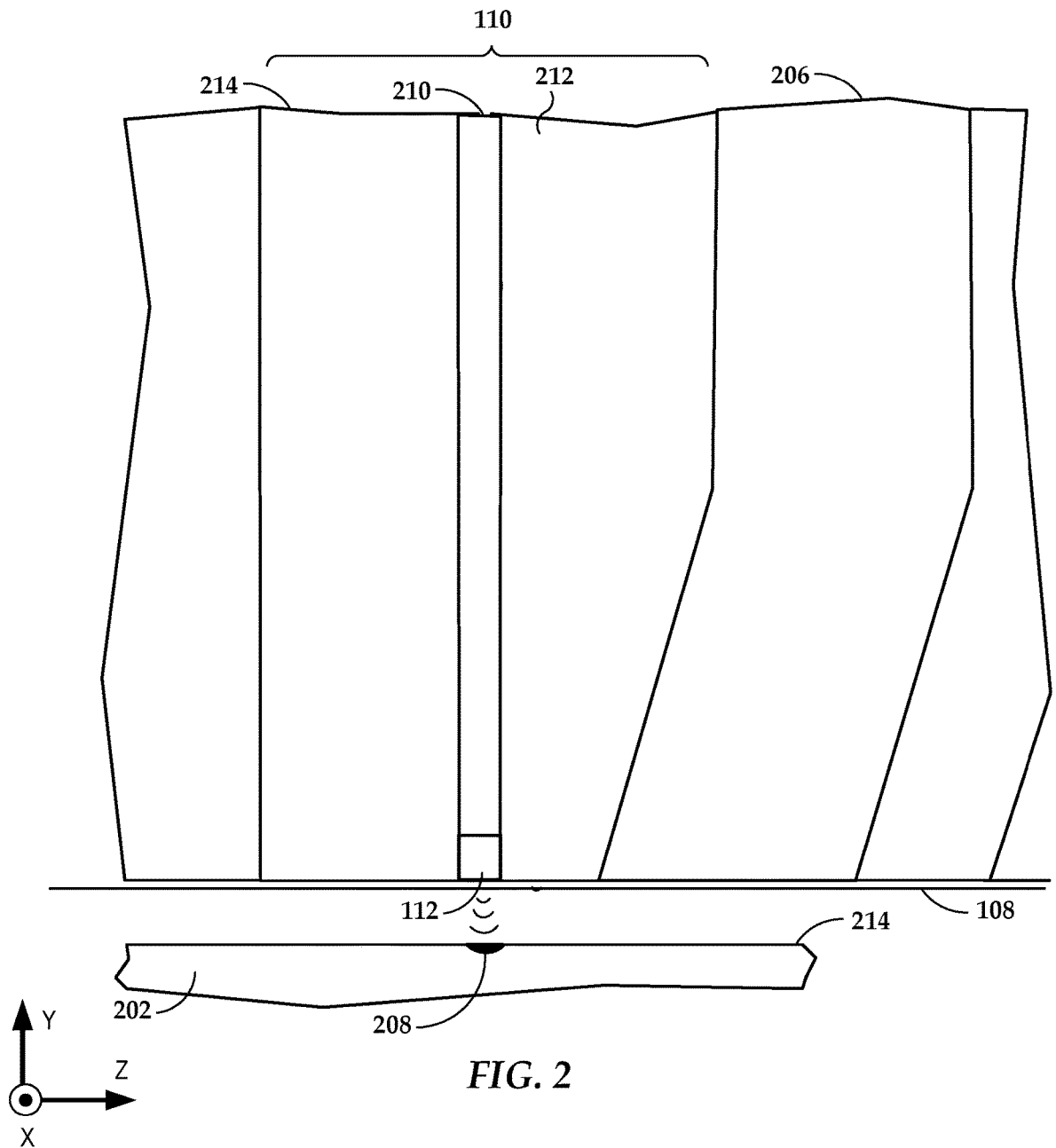
FIG. 2 is a cross-sectional view shows details of a HAMR apparatus in accordance with embodiments described herein.

In reference now to FIG. 2, a cross-sectional view shows details of a HAMR apparatus according to an example embodiment. NFT 112 is located proximate a media-facing surface 108 (e.g., ABS), which is held near a magnetic recording media 202 during device operation. In the orientation of FIG. 2, the media-facing surface 108 is arranged parallel to the x-z plane. A waveguide system 210 may be disposed proximate the NFT 112, which is located at or near the media writing surface 214.

The waveguide system 210 is surrounded by cladding layers 212, 214. The waveguide system 210 and cladding layers 212, 214 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, $AlO_x$, etc. Generally, the dielectric materials are selected so that the refractive index of at least one of the waveguide cores of the waveguide system is higher than refractive indices of the cladding layers 212, 214. This arrangement of materials facilitates efficient propagation of light through the waveguide. Light is delivered from the waveguide system 210 along the negative y-direction where it is coupled to the NFT 112. The NFT 112 delivers surface plasmon enhanced, near-field electromagnetic energy along the y-axis where it exits at the media writing surface 214. This may result in a highly localized hot spot 208 on the media surface 214 when the media 202 placed in close proximity to surface 108 of the apparatus. Further illustrated in FIG. 2 is a recording pole 206 of the read/write head that is located alongside the NFT 112. The recording pole 206 generates a magnetic field (e.g., perpendicular field) used in changing the magnetic orientation of the hotspot during writing.

In some cases, the NFT 112 is a part of the waveguide core 210. In this embodiment, the waveguide may function as a waveguide and an NFT. This type of waveguide may be referred to herein as a "plasmonic gap waveguide," a "gap waveguide," and/or an "aperture waveguide." The gap waveguide may be embedded in a cladding material that allows the waveguide to operate as a heat sink and an NFT. This allows the gap waveguide to sink heat away from the waveguide core. For example, the gap waveguide may be embedded in a material having a high thermal conductivity such as Au and/or Cu. In some cases, the gap waveguide is embedded in Au because it has one of the highest levels of thermal conductivity and plasmonic quality factor. According to various configurations, the waveguide may be at least partially embedded in a harder material than Au or Cu such as Rh, for example. Using a hard material to at least partially surround the waveguide may increase the reliability of the write head. A plasmonic gap waveguide may allow for higher localized electric fields that would be translated into smaller thermal spots with higher thermal gradients than in a system having a peg-based NFT. The gap waveguide system may also allow the device to effectively operate at lower temperatures than a system that has a peg-based NFT.

The plasmonic gap waveguide is based on the optical coupling between two surface plasmon polaritons (SPPs) that propagates in each of the interfaces between the waveguide core and the cladding layers. The plasmonic gap waveguide may be excited by injecting an electric TM and/or TE mode into the waveguide. The reduction of the width and gap separation between the layers can be adjusted to shape the thermal spot size and the thermal gradient in the magnetic recording media.

According to various embodiments, a plasmonic gap waveguide comprises a dielectric core placed between two separated metallic stripes forming a metallic-dielectric-metallic sandwich where the two SPPs propagating in the dielectric-metal interfaces are coupled confining the electric field around the gap. In some cases, the plasmonic gap waveguide has a taper that narrows as it approaches the media-facing surface of the slider. The tapered waveguide core may be embedded in a metallic material. The mode is excited by injecting a TM mode or a TE mode in a wider waveguide that is progressively tapered in order to couple the two SPPs modes into the gap waveguide. The electric field generated at a plasmonic-gap waveguide output is used as a heat source to generate a sharp and highly localized thermal spot on the magnetic media.

Figure 3:
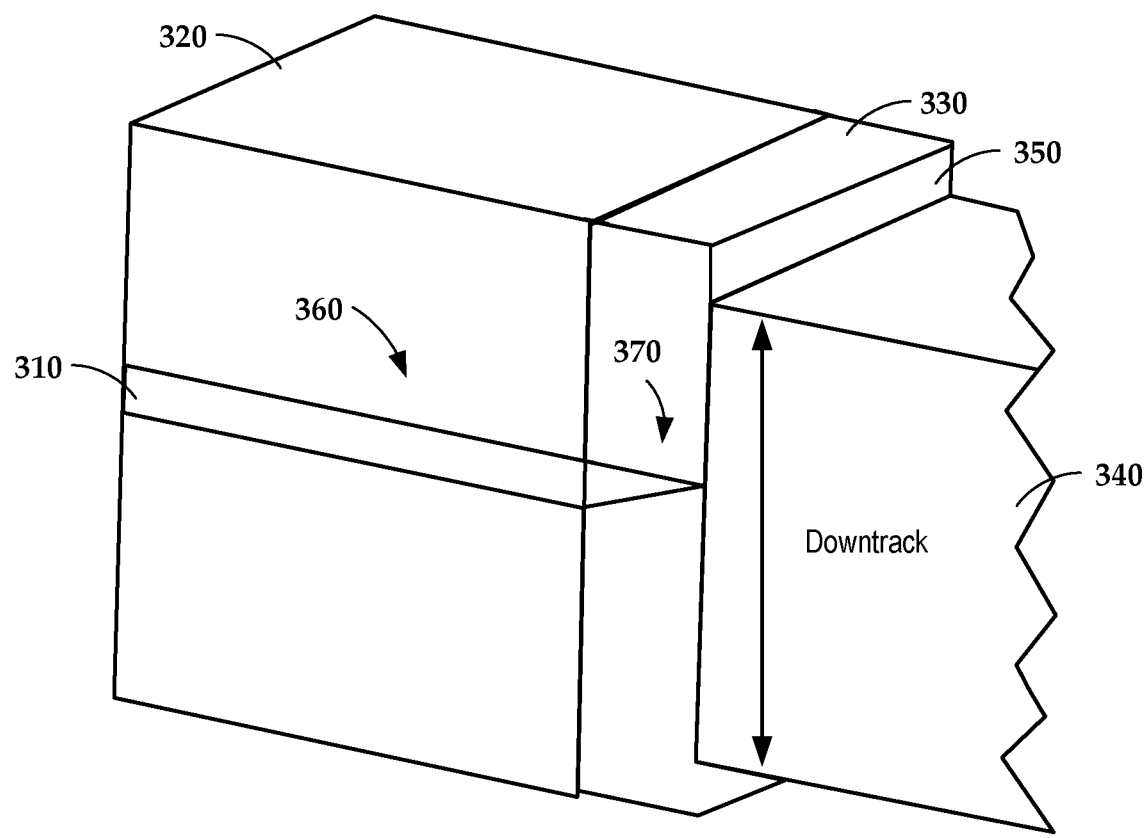
FIG. 3 illustrates a plasmonic gap waveguide that has a narrowing taper as it approaches the air bearing surface in accordance with embodiments described herein.

FIG. 3 illustrates a plasmonic gap waveguide that has a narrowing taper as it approaches the ABS. The waveguide core 310 may have a substantially constant cross-sectional width in a first portion 360 closer to the light source. The waveguide core 310 may begin to taper in a second portion 370 and continue to taper until it reaches the ABS 350 proximate the media 340. In some cases, the waveguide core 310 may stop tapering at a point before the ABS 350. The waveguide core 310 is surrounded by one or more cladding layers 320, 330 that may have a different index of refraction than the material of the waveguide core 310. For example, the index of refraction of the waveguide core 310 may be less than the index of refraction of at least one of the cladding layers 320, 330. According to various implementations, a first cladding layer 320 is used to surround the first portion 360 of the waveguide core 310. According to some embodiments the first cladding layer 320 comprises $SiO_2$. A second cladding layer 330 may be used to surround the second portion 370 of the waveguide core 310. The material used for the first cladding layer 320 may have the same or different index of refraction than the material used for the second cladding layer 330 and/or the waveguide core 310. According to some embodiments, the second cladding layer 330 comprises Au and/or Rh. In some case, the second cladding layer 330 starts at substantially the same point in which the waveguide core 310 starts to taper toward to ABS 350. In some embodiments, at least a portion of the first portion 360 of the waveguide core 310 is surrounded by the second cladding layer 330.

Figure 4:
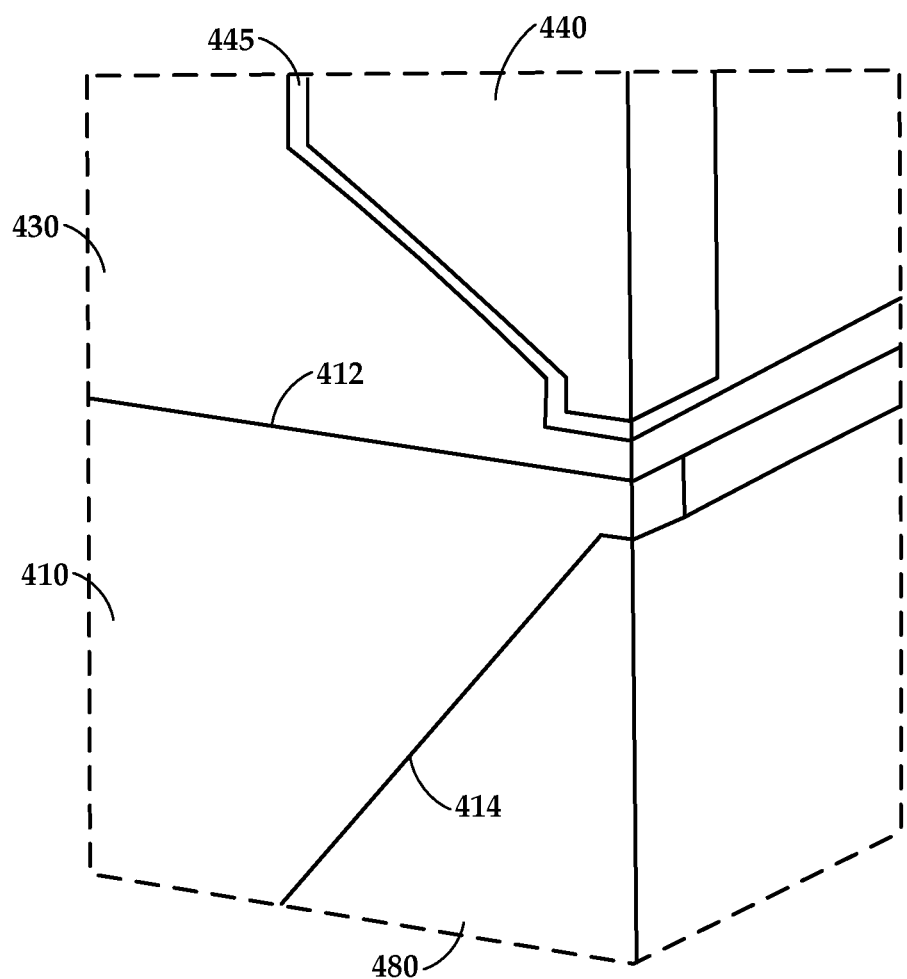
FIG. 4 illustrates a plasmonic gap waveguide system in accordance with embodiments described herein.

FIG. 4 illustrates a more detailed view of a plasmonic gap waveguide system in accordance with embodiments described herein. In this example, a gap waveguide 410 has a first side 412 proximate a write pole 440 and a second side 414 opposite the first side 412. According to various implementations, the waveguide 410 is tapered along the second side 414. In some cases, a diffusion barrier 445 at least partially surrounds the write pole 440. The diffusion barrier 445 may comprise Ru, for example. The diffusion barrier may have a thickness in a range of about 10 nm to about 20 nm. In some cases, the diffusion barrier thickness is about 15 nm. The waveguide system comprises one or more cladding layers. A top cladding layer 430 is disposed proximate the first side 412 of the gap waveguide 410 and has a bottom cladding layer 480 proximate the second side 414 of the gap waveguide 410. The top cladding layer 430 may comprise the same or different materials than the bottom cladding layer 480. For example, the top cladding layer 430 may comprise Au and the bottom cladding layer 480 may comprise Rh. In some cases, the top 430 and the bottom 480 cladding layers both comprise Au.

Figure 5:
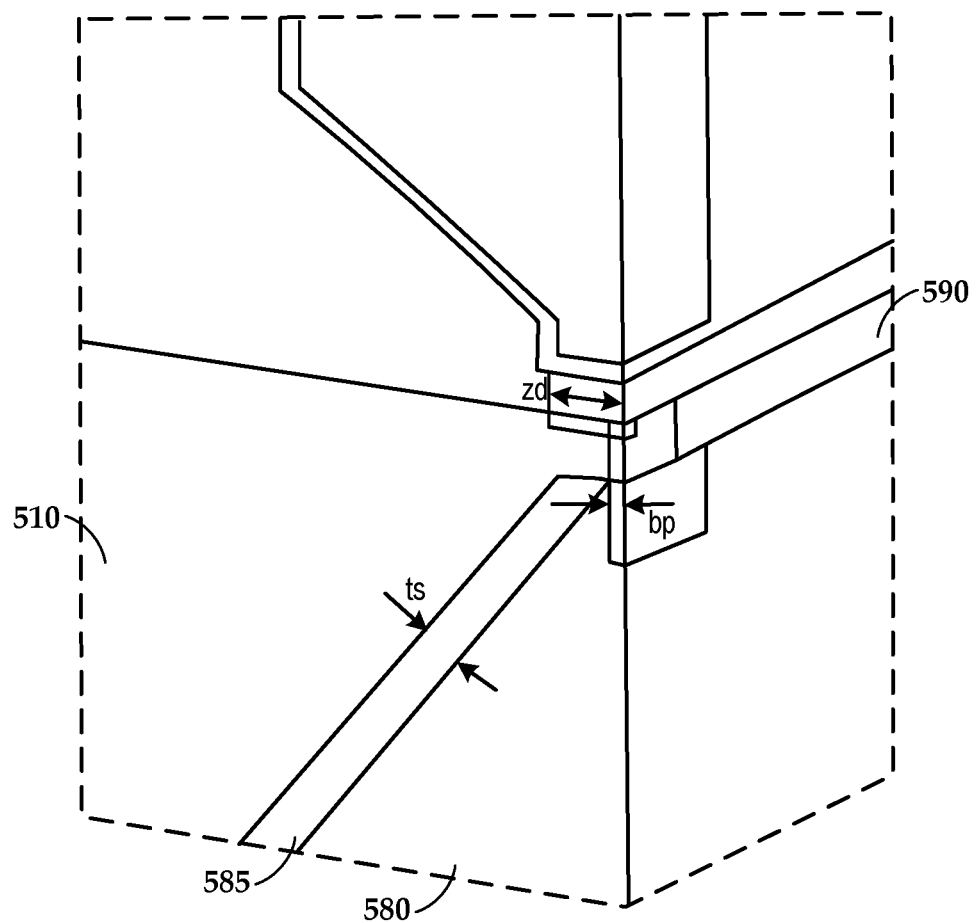
FIG. 5 illustrates an example in which a strip of plasmonic material is disposed between the bottom cladding layer and the waveguide core in accordance with embodiments described herein.
Figure 6:
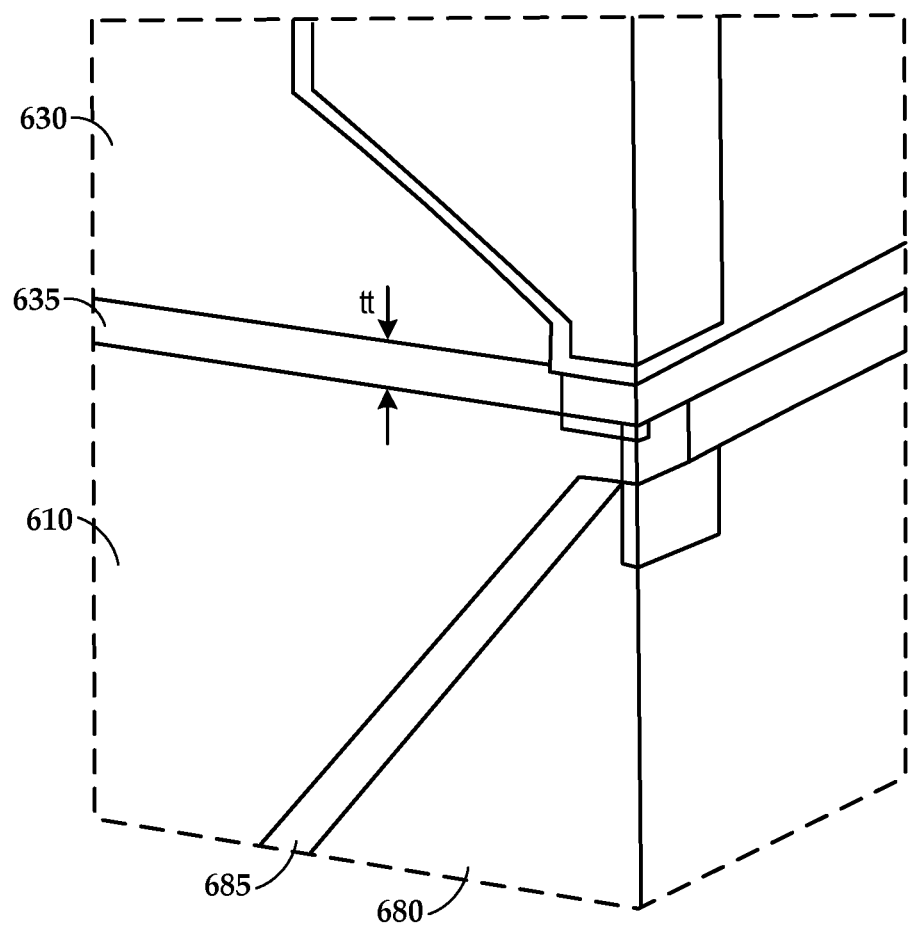
FIG. 6 shows an example in which a strip of plasmonic material is disposed between the top cladding layer and the waveguide core in accordance with embodiments described herein.

According to some configurations, a strip of plasmonic material, e.g., Au, Cu, Cu—X, etc. may be disposed between the bottom cladding layer and the waveguide core and/or between the waveguide core and the top cladding layer. While the configurations described herein generally use Au, Cu, and/or CuZn as the material for the plasmonic material, it is to be understood that any plasmonic material can be used. FIGS. 5 and 6 illustrate examples having a strip of plasmonic material disposed along at least a portion of the waveguide core. The strip of plasmonic material may reduce one or both of the head temperature and laser power and/or increase the hardness and/or stability of the head. According to various implementations, using harder materials tends to increase the temperature. Harder materials may be able to withstand higher temperatures than that of softer materials. In general, Au has a hardness of about 200 MPa, Cu has a hardness of about 300 MPa, CuZn has a hardness of about 700 MPa, and Rh has a hardness of about 1200 MPa.

FIG. 5 illustrates an example in which a strip of plasmonic material 585 is disposed between the bottom cladding layer 580 and the waveguide core 510. The strip has a thickness, ts, that is in a range of about 20 nm to about 60 nm. In some cases, ts is in a range of about 30 nm to about 50 nm. According to various configurations, at least part of the first side of the waveguide core 510 is disposed proximate a second top cladding layer 590. The second top cladding layer 590 may be disposed at the ABS. According to various configurations, the second top cladding layer 590 comprises Rh. The second top cladding layer may have a width, zd, of about 50 nm, for example. The flat top portion of the bottom cladding layer 580 is represented by bp. According to various embodiments, bp is in a range of about 10 nm to about 20 nm. In some cases bp is about 15 nm.

Table 1 shows thermal gradient downtrack (TGD), the thermal gradient crosstrack (TGC), the track width (TW), the laser power (Preq), and the maximum head temperature (Thead_max), and the thickness of the strip is on the bottom cladding layer for one configuration having no strip on the bottom cladding layer and three configurations having a strip of plasmonic material on the bottom cladding layer. T_Rh represents the maximum temperature in the Rh portion, T_Au represents the maximum temperature in the Au portion, T_Cu represents the maximum temperature in the Cu portion, and T_CuZn represents the maximum temperature in the CuZn portion of the waveguide system. As can be observed, the configurations having a strip of plasmonic material on the bottom cladding layer have a lower laser power than with the configuration with no strip of plasmonic material on the bottom cladding layer.

TABLE 1

| TGD (K/nm) | TGC (K/nm) | TW (nm) | Preq (mW) | Thead_Max (° C.) | T_Rh (° C.) | T_Au (° C.) | T_Cu (° C.) | T_CuZn (° C.) | ts (nm) |
|---|---|---|---|---|---|---|---|---|---|
| No strip of plasmonic material ||||||||||
| 7.75 | 5.20 | 60 | 9.92 | 185.51 | 186.39 | 137.81 | — | — | 0 |
| Au on bottom cladding layer ||||||||||
| 8.06 | 5.20 | 60 | 8.03 | 123.25 | 117.96 | 101.01 | — | — | 50 |
| Cu on bottom cladding layer ||||||||||
| 8.08 | 5.22 | 60 | 8.27 | 129.53 | 122.98 | 101.96 | 109.88 | — | 50 |
| CuZn on bottom cladding layer ||||||||||
| 8.05 | 5.19 | 60 | 8.91 | 150.68 | 148.52 | 116.71 | — | 144.93 | 30 |

FIG. 6 illustrates an example in which a strip of plasmonic material 635 is disposed between the top cladding layer 630 and the waveguide core 610. According to various embodiments a first strip of plasmonic material 635 is disposed between the top cladding layer 630 and the waveguide core 610 and a second strip of plasmonic material 685 is disposed on the bottom cladding layer 680. According to various implementations, the first strip of plasmonic material 635 comprises the same material as the second strip of plasmonic material 685. In some cases, the first strip of plasmonic material 635 comprises a material different than that of the second strip of plasmonic material 685.

The strip has a thickness, tt, that is in a range of about 40 nm to about 60 nm. In some cases tt is about 50 nm. According to various configurations, the second strip of plasmonic material 685 comprises Au. In some cases, there is second plasmonic strip 685 on the bottom cladding layer 680 and the waveguide core 610 is in direct contact with the bottom cladding layer 680.

Table 2 shows thermal gradient downtrack (TGD), the thermal gradient crosstrack (TGC), the track width (TW), the laser power (Preq), and the maximum head temperature (Thead_max), and the thickness of the strip is on the bottom cladding layer for three configurations having a strip of Au on the bottom cladding layer and a strip of Au, Cu, or CuZn on the top cladding layer. T_Rh represents the maximum temperature in the Rh portion, T_Au represents the maximum temperature in the Au portion, T_Cu represents the maximum temperature in the Cu portion, and T_CuZn represents the maximum temperature in the CuZn portion of the waveguide system. As can be observed, the configuration having a strip of Au between the waveguide core and the top cladding layer has a lower laser power than the other configurations.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

TABLE 2

| TGD (K/nm) | TGC (K/nm) | TW (nm) | Preq (mW) | Thead_Max (° C.) | T_Rh (° C.) | T_Au (° C.) | T_Cu (° C.) | T_CuZn (° C.) | ts (nm) |
|---|---|---|---|---|---|---|---|---|---|
| Au on bottom cladding layer, Au on top cladding layer | | | | | | | | | |
| 8.06 | 5.20 | 60 | 8.03 | 123.25 | 117.96 | 101.01 | — | — | 50 |
| Au on bottom cladding layer, Cu on top cladding layer | | | | | | | | | |
| 8.08 | 5.21 | 60 | 8.42 | 130.92 | 126.14 | 107.77 | 94.57 | — | 50 |
| Au on bottom cladding layer, CuZn on top cladding layer | | | | | | | | | |
| 8.05 | 5.19 | 60 | 9.47 | 154.87 | 150.69 | 130.91 | — | 134.07 | 50 |

Table 3 shows thermal gradient downtrack (TGD), the thermal gradient crosstrack (TGC), the track width (TW), the laser power (Preq), and the maximum head temperature (Thead_max), and the thickness of the strip is on the bottom cladding layer for three configurations having a strip of Au, Cu, or CuZn on the bottom cladding layer and a strip of Au, Cu, or CuZn on the top cladding layer. T_Rh represents the maximum temperature in the Rh portion, T_Au represents the maximum temperature in the Au portion, T_Cu represents the maximum temperature in the Cu portion, and T_CuZn represents the maximum temperature in the CuZn portion of the waveguide system. The configuration having a strip of Au between the waveguide core and the top cladding layer and a strip of Au on the bottom cladding layer has a lower laser power than the other configurations.

What is claimed is:

1. An apparatus comprising:
   a slider configured for heat-assisted magnetic recording, the slider comprising:
   an input coupler configured to receive light excited by a light source;
   a waveguide core tapering along a light propagation direction from a first cross-sectional width to a second cross-sectional width, the waveguide configured to provide a surface plasmon-enhanced near-field radiation pattern proximate an output end in response to the received light;
   one or more cladding layers surrounding the waveguide core; and
   at least one strip of plasmonic material disposed between the waveguide core and at least one of the one or more cladding layers, wherein:

TABLE 3

| TGD (K/nm) | TGC (K/nm) | TW (nm) | Preq (mW) | Thead_Max (° C.) | T_Rh (° C.) | T_Au (° C.) | T_Cu (° C.) | T_CuZn (° C.) | ts (nm) |
|---|---|---|---|---|---|---|---|---|---|
| Au on bottom cladding layer, Au on top cladding layer | | | | | | | | | |
| 8.06 | 5.20 | 60 | 8.03 | 123.25 | 117.96 | 101.01 | — | — | 50 |
| Cu on bottom cladding layer, Cu on top cladding layer | | | | | | | | | |
| 8.08 | 5.22 | 60 | 8.67 | 136.53 | 130.27 | — | 116.31 | — | 50 |
| CuZn on bottom cladding layer, CuZn on top cladding layer | | | | | | | | | |
| 7.98 | 5.14 | 60 | 10.30 | 175.01 | 170.18 | 139.14 | — | 166.75 | 50 | the waveguide core comprises a first side facing a write pole of the slider and a second opposing side facing away from the write pole; and the at least one strip of plasmonic material is disposed on the first side and the second side of the wave aide core.

2. The apparatus of claim 1, wherein the second side of the waveguide core is in direct contact with the bottom cladding; layer.

3. The apparatus of claim 1, wherein the one or more cladding layers comprises a top cladding layer on the first side of the waveguide core and a bottom cladding layer on the second side of the waveguide core.

4. The apparatus of claim 3, wherein the bottom cladding layer comprises Rh.

5. The apparatus of claim 3, wherein the top cladding layer comprises Au.

6. The apparatus of claim 1, wherein the at least one strip of plasmonic material comprises one or more of Au, Cu, and Cu alloys.

7. The apparatus of claim 1, wherein the at least one strip of plasmonic material has a thickness of about 50 nm.

8. The apparatus of claim 1, wherein:

the at least one strip of plasmonic material comprises a first strip disposed on the first side of the waveguide core and a second strip disposed on the second side of the waveguide core; and the first strip and the second strip comprise the same material.

9. The apparatus of claim 1, wherein:

the at least one strip of plasmonic material comprises a first strip disposed on the first side of the waveguide core and a second strip disposed on the second side of the waveguide core; and the first strip and the second strip comprise different materials.

10. An apparatus comprising:

a slider configured for heat-assisted magnetic recording, the slider comprising:

an input coupler configured to receive light excited by a light source;

a waveguide core tapering along a light propagation direction from a first cross-sectional width to a second cross-sectional width, the waveguide configured to provide a surface plasmon-enhanced near-field radiation pattern proximate an output end in response to the received light, the waveguide core having a first side facing a write pole of the slider and a second opposing side facing away from the write pole;

a top cladding layer disposed on the first side of the waveguide core;

a bottom cladding layer disposed on the second side of the waveguide core; and at least one strip of plasmonic material between the waveguide core and at least one of the top cladding layer and the bottom cladding layer;

wherein the at least one strip of plasmonic material comprises a first strip disposed on the first side of the waveguide core and a second strip disposed on the second side of the waveguide core.

11. The apparatus of claim 10, wherein the second side of the waveguide core is in direct contact with the bottom cladding layer.

12. The apparatus of claim 10, wherein the first side of the waveguide core is in direct contact with the op cladding layer.

13. The apparatus of claim 10, wherein the first strip and the second strip comprise the same material.

14. The apparatus of claim 10, wherein the first strip and the second strip comprise different materials.

15. The apparatus of claim 10, wherein the bottom cladding layer comprises Rh.

16. The apparatus of claim 10, wherein the top cladding layer comprises Au.

17. The apparatus of claim 10, wherein the at least one strip of plasmonic material comprises one or more of Au, Cu, and Cu alloys.

18. The apparatus of claim 10, wherein the at least one strip of plasmonic material has a thickness of about 50 nm.

* * * * *

UNITED STATES PATENT AND TRADEMARK OFFICE
CERTIFICATE OF CORRECTION

| | | |
|---|---|---|
| PATENT NO. | : 11,443,764 B1 | Page 1 of 1 |
| APPLICATION NO. | : 16/291491 | |
| DATED | : September 13, 2022 | |
| INVENTOR(S) | : Choon How Gan et al. | |

It is certified that error appears in the above-identified patent and that said Letters Patent is hereby corrected as shown below:

In the Claims

In Claim 1 Line 5, "wave aide" should read -- waveguide --.

In Claim 12 Line 26, "op" should read -- top --.

Signed and Sealed this
Eighteenth Day of April, 2023

Katherine Kelly Vidal
*Director of the United States Patent and Trademark Office*